United States Patent [19]
Spurr et al.

[11] Patent Number: 6,013,998
[45] Date of Patent: Jan. 11, 2000

[54] METHOD FOR COMPENSATING FOR POSITIONAL ERROR INHERENT TO STEPPER MOTORS RUNNING IN MICROSTEPPING MODE

[75] Inventors: Robert W. Spurr, Rochester; Seung Ho Baek, Pittsford, both of N.Y.

[73] Assignee: Eastman Kodak Company, Rochester, N.Y.

[21] Appl. No.: 09/124,331

[22] Filed: Jul. 29, 1998

[51] Int. Cl.[7] ............................................ G05B 19/40
[52] U.S. Cl. ........................ 318/685; 318/696; 347/37
[58] Field of Search .................................. 318/696, 695, 318/632, 171, 189, 490, 702; 310/49 R, 112, 156, 162; 346/134; 347/37

[56] References Cited

U.S. PATENT DOCUMENTS

| | | | |
|---|---|---|---|
| 3,908,158 | 9/1975 | Studtmann | 318/227 |
| 4,115,726 | 9/1978 | Patterson et al. | 318/171 |
| 4,302,712 | 11/1981 | Pritchard | 318/490 |
| 4,426,608 | 1/1984 | Larson et al. | 318/685 |
| 4,443,746 | 4/1984 | Araki | 318/696 |
| 4,446,412 | 5/1984 | Friedman et al. | 318/696 |
| 4,584,512 | 4/1986 | Pritchard | 318/696 |
| 4,629,916 | 12/1986 | Oudet | 310/49 R |
| 4,642,494 | 2/1987 | Lundin et al. | 310/49 R |
| 4,652,806 | 3/1987 | Aiello | 318/696 |
| 4,703,243 | 10/1987 | Ettelman et al. | 318/696 |
| 4,710,691 | 12/1987 | Bergstrom et al. | 318/696 |
| 4,739,201 | 4/1988 | Brigham et al. | 318/696 |
| 5,268,708 | 12/1993 | Harshbarger et al. | 346/134 |
| 5,410,200 | 4/1995 | Sakamoto et al. | 310/49 R |

*Primary Examiner*—Robert E. Nappi
*Assistant Examiner*—Rita Leykin
*Attorney, Agent, or Firm*—Milton S. Sales

[57] ABSTRACT

A stepper motor that turns a lead screw runs in microstepping mode. To compensate for positional error in microstepping, the method utilizes the characteristic sinusoidal positional error behavior that is measured at four times the frequency of the composite microstepping current waveform, using a correction factor that is in phase with this positional error.

6 Claims, 8 Drawing Sheets

FIG. 5

# METHOD FOR COMPENSATING FOR POSITIONAL ERROR INHERENT TO STEPPER MOTORS RUNNING IN MICROSTEPPING MODE

FIELD OF THE INVENTION

This invention applies to systems that use a stepper motor that operates in microstepping mode.

BACKGROUND OF THE INVENTION

Commonly assigned U.S. Pat. No. 5,268,708, which issued to Harshbarger et al. on Dec. 7, 1993, discloses an image processing apparatus arranged to form an intended image on a receiver secured to the periphery of an imaging drum while the drum is rotated past a printhead. A translation drive then traverses the printhead axially along the imaging drum, in coordinated motion with the rotating imaging drum. A scanning subsystem or write engine provides the scanning function by generating a once per revolution timing signal to data path electronics as a clock signal while the translation drive traverses the printhead.

The translation drive motion is obtained using a DC servo motor with a feedback encoder. The DC servo motor rotates a lead screw that is aligned generally in parallel with the axis of the vacuum imaging drum. The DC servo drive motor induces rotation to the lead screw moving the translation stage member and print head along the threaded shaft as the lead screw is rotated. The lateral directional movement of the print head is controlled by switching the direction of rotation of the DC servo drive motor and thus the lead screw.

Although the presently known and utilized image processing apparatus is satisfactory, it is not without drawbacks. The DC servo motor that is used to drive the lead screw requires feedback control signals from an expensive, high-precision encoder. Control circuitry must accept the encoder signal as input and process this feedback signal to obtain the correct output signal for driving the DC servo motor. The need for these added components increases the cost and design complexity of the image processing apparatus.

As an alternative method for providing precise rotational positioning, a stepper motor can be employed. Stepper motors provide precise rotational motion that can be used to rotate a lead screw device in order to provide precise linear motion. The stepper motor has a shaft motion characterized by the capability to achieve discrete angular movements of uniform magnitude based on its input signal. In its simplest implementation, this type of motor is driven by a sequentially switched DC power supply that provides square-wave current pulses rather than analog current values.

Internally, the stepper motor uses magnetic attraction and repulsion of a rotor in discrete steps so that the rotor takes an angular orientation at some integral multiple of a divisor angle that is based on the number and position of stator teeth and on rotor characteristics. To achieve this controlled motion, the stepper motor has two separate windings (A and B). The drive components for the stepper motor coordinate the timing of current to each set of windings so that different internal stator poles have different magnetic states for each rotor position. In a "full step current, 2-phase on" mode, windings A and B are independently energized in one of two discrete current levels, at full current. This arrangement provides highly precise positioning for most stepper motors to, typically, four hundred steps per rotation. With four hundred steps per rotation, each step moves the rotor 0.9 degrees.

For some applications, such as in an image processing apparatus, however, finer resolution than four hundred steps per revolution is required. To achieve finer resolution from the stepper motor and lead screw design, there would be significant physical requirements and cost. For example, using a finer lead screw resolution requires that the drive motor accelerate and run at faster speeds than may be practicable for rapid starting and stopping. This requirement for higher speeds also complicates synchronization between the print head traversal subsystem and the vacuum drum motor. To overcome this and other limitations, the stepper motor can be used in microstepping mode. This uses the fact that variable amounts of current through stator windings in turn vary the amount of magnetic force in the stator pole. This allows the rotor to take intermediate angular positions, between the discrete "step" positions described earlier.

In microstepping mode, the phase current exhibits a voltage-time relationship with discrete steps such that the composite waveform is sinusoidal. With microstepping, the A and B phases are substantially two sine waves with 90 degrees phase shift from each other. Since the rotor position adjusts in some proportion to the magnetic force from stator windings, this allows the rotor to take intermediate positions. This arrangement gives the stepper motor many times the positioning resolution of discrete stepping using square wave current input. Typically, the upper range achievable using microstepping is about five hundred microsteps per step. For a motor with four hundred steps per revolution, for example, this would allow two hundred thousand microsteps per revolution.

The tradeoffs with microstepping include variable torque, since different levels of current are flowing for each different position. In addition, since stator windings are energized at some intermediate current level, rather than at full current, rotor position is not as stable as with full step mode. Hence, the accuracy of each microstep is not as precise as is accuracy for full steps. Typically, feedback loops are employed to improve positioning as compensation for this loss of positional accuracy when using microstepping. However, feedback loops require costly design effort and precision feedback components.

The mechanism for print head positioning in image processing apparatus must overcome the inherent inaccuracy in microstepping, as described above. This presents particular difficulty for the process of synchronizing print head positioning at the beginning of each swath. Any additive error that accumulates over the length of the image may cause sizing problems, banding, or other objectionable image anomalies.

There has been widespread use of stepping motors and microstepping, including circuitry components specifically designed to allow modification of the current using look-up tables or other control means to effectively shape the phase current waveform (Example: Compumotor OEM650 Motor Drive User Guide gives jumper settings for modifying motor waveform shape). Existing techniques also allow modification of the third harmonic frequency of the current waveform, attenuating this harmonic component to smooth the delivered signal which alters the composite current waveform from its normal sine wave characteristic.

Reference materials showing microstepping include Compumotor Catalog, Step Motor & Servo Motor Systems and Controls, Parker Motion & Control, Rohnert Park, Calif.; Compumotor OEM650 Drive and Drive/Indexer User Guide; P/N 88-013157-02A, Compumotor Division, Parker Hannifin Corporation, Rohnert Park, Calif.; and Data Sheet, IM2000 High Performance Microstepping Controller, Intelligent Motion Systems, Inc., Taftville, Conn. Patents that disclose methods for increasing the accuracy of a stepper motor in microstepping mode include U.S. Pat. No. 4,710, 691, which issued to Bergstrom et al. on Dec. 1, 1987, and discloses use of a special apparatus to characterize positional error and correct this error by a process of measurement, adjustment, re-checking, and storing the corrected phase winding current values in memory; U.S. Pat. No. 4,584,512, which issued to Pritchard on Apr. 22, 1986, and discloses the use of harmonic frequencies of the stepper motor windings current to adjust motor resonance; and U.S. Pat. No. 4,115, 726, which issued to Patterson, et al. on Sep. 19, 1978, and discloses the use of odd harmonics for stepping motor compensation.

DISCLOSURE OF THE INVENTION

It is the object of the present invention to use microstepping with current waveform shaping, based on the characteristics of positioning error as measured under load.

The present invention compensates for cyclic positioning error, which has a frequency that is four times the sinusoidal frequency of the composite microstepping current waveform, by correcting the microstepping current waveform using a percentage of the positional error as an offset. The amount of compensation is calculated using both polarity and magnitude of the error.

It is an advantage of the present invention that it restores some of the positional accuracy that is otherwise lost when using a stepper motor in microstepping mode.

It is an advantage of the present invention that, once the error signal is characterized, it allows precise positional control of lead screw rotation without requiring encoder feedback and without the support circuitry that would be otherwise needed for the control loop.

It is an advantage of the present invention that, once the error signal for the traversal subsystem is characterized in an apparatus, the solution of this invention can be applied to multiple versions of the same subsystem in manufacture, without the need to test or fine-tune performance for each individual traversal subsystem, provided that the motor torque specified is sufficient for the reflected load.

It is an advantage of the present invention that it allows the use of a stepper motor to switch between two "stepping" modes in an apparatus: using full-step mode for precise discrete positioning (such as for precisely locating a print head at the start of a swath) and then using microstepping mode for higher resolution positional addressability (such as for moving a print head while writing the swath).

It is an advantage of the present invention that it allows rapid switching of a stepper motor between microstepping mode and the normal stepping mode using full or half steps.

It is an advantage of the present invention that it does not "over-correct", but applies variable correction to the periodic current waveform so that correction factor is largest when positional error is greatest and the correction factor is zero when the positional error is minimal or zero.

It is an advantage of the present invention that it allows a much coarser lead screw to be used for load positioning (on the order of 10 to 20 times the pitch of the lead screw for existing apparatus).

The present invention is directed to overcoming one or more of the problems set forth above. Briefly summarized, according to one aspect of the present invention, the invention resides in a stepper motor operating in microstepping mode being used to position a load. To increase positional accuracy during microstepping, the current waveforms (for both A and B windings) are modified based on the characteristics of the measured positional error under load, which positional error is itself cyclic at four times the frequency of the sinusoidal composite current waveform. This invention effectively reduces the actual error amplitude and restores some of the positional accuracy lost when the stepper motor runs in microstepping mode.

According to a feature of the present invention, a method is provided for shaping a composite windings drive current waveform of a stepping motor running in microstepping mode so as to minimize positioning error of the stepping motor. The method includes the steps of determining a characteristic positional error that is periodic at four times the sinusoidal frequency of the composite windings drive current waveform; and variably adjusting the windings drive current waveform at each microstep based on the characteristic positioning error.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art. Although not described in detail, it would be obvious to someone skilled in the art that this invention could be used in most applications that use a stepper motor running in microstepping mode. This invention can apply to most applications using microstepping where the error characteristic is periodic and can be characterized and used to alter the windings current in a manner that corresponds to the error waveform.

Figure 1:
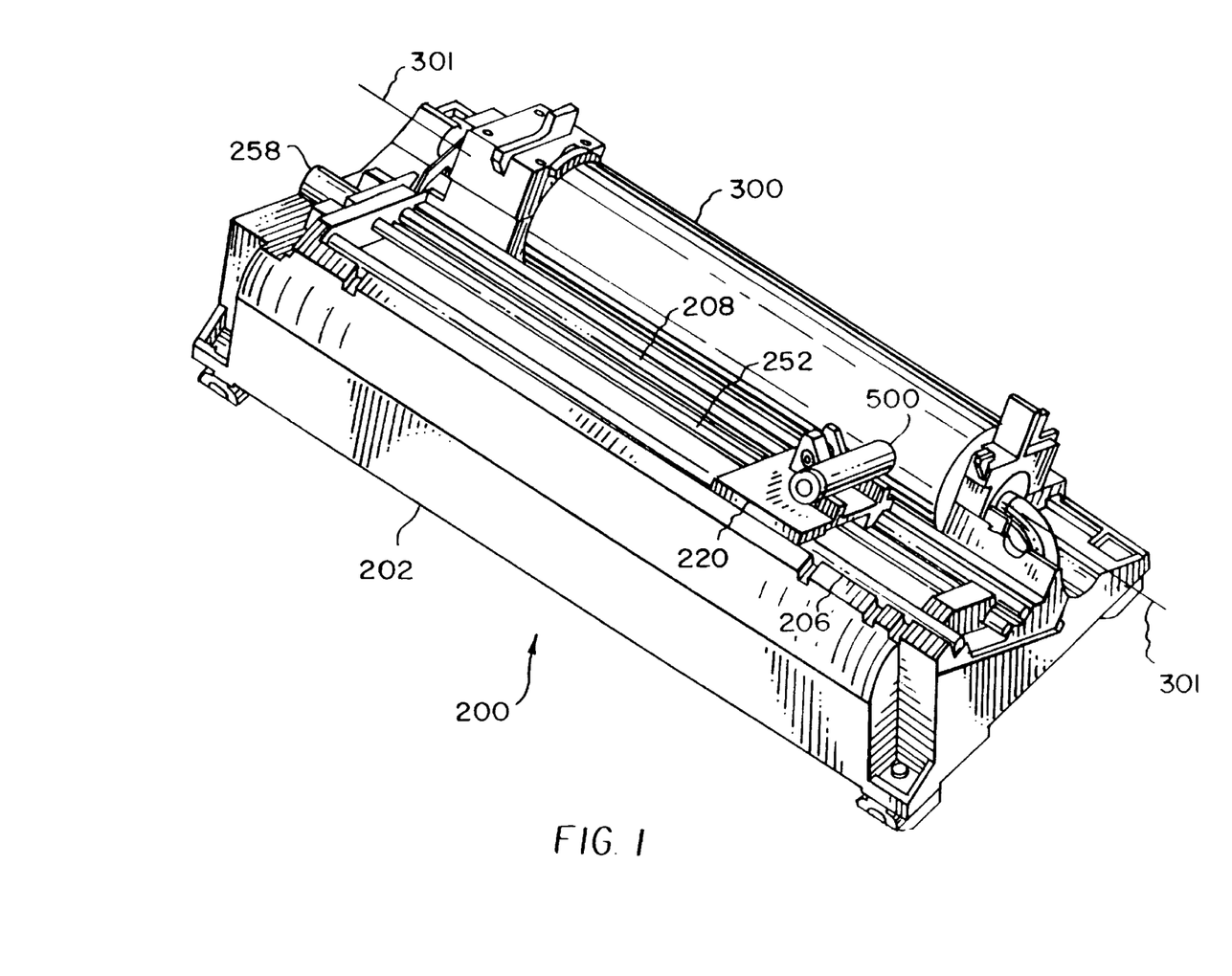
FIG. 1 is a perspective view of the lathe bed scanning subsystem or write engine in which the present invention is useful.

Referring to FIG. 1, there is illustrated a perspective view of the lathe bed scanning subsystem 200 of an image processing apparatus, including an imaging drum 300, a printhead 500 and lead screw assembled in a lathe bed scanning frame 202. Imaging drum 300 is mounted for rotation about an axis 301 in lathe bed scanning frame 202. Printhead 500 is movable with respect to imaging drum 300, and is arranged to direct a beam of light to a receiver. The beam of light from printhead 500 is modulated by electronic signals from the image processing apparatus, which are representative of the shape and color of the original image.

Printhead 500 is mounted on a movable translation stage member 220 which, in turn, is supported for low friction slidable movement on a pair of rigid translation bearing rods 206 and 208, which are parallel to axis 301 of imaging drum 300. The axis of printhead 500 is perpendicular to axis 301.

Figure 2:
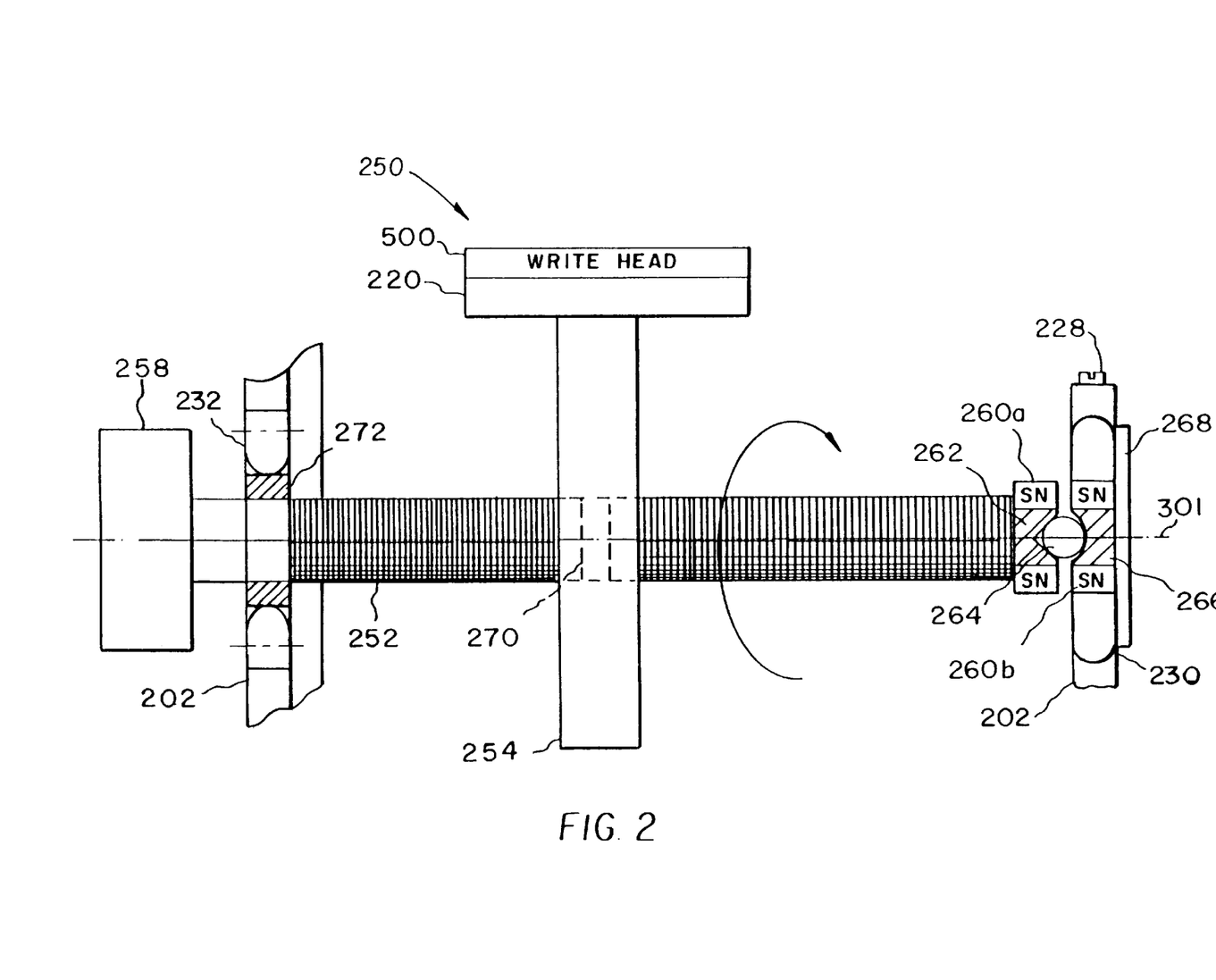
FIG. 2 is a top view in horizontal cross-section, partially in phantom, of the lead screw of the present invention.

Referring to FIGS. 1 and 2, lead screw 250 includes an elongated, threaded shaft 252 attached to a linear drive motor 258 on its drive end and to lathe bed scanning frame 202 by means of a radial bearing 272. A lead screw drive nut 254 includes grooves in its hollowed-out center portion 270 for mating with the threads of threaded shaft 252 for permitting lead screw drive nut 254 to move axially along threaded shaft 252 as threaded shaft 252 is rotated by linear drive motor 258. Lead screw drive nut 254 is integrally attached to printhead 500 through a lead screw coupling (not shown) and translation stage member 220 at its periphery so that, as threaded shaft 252 is rotated by linear drive motor 258, lead screw drive nut 254 moves axially along threaded shaft 252, which in turn moves translation stage member 220 and ultimately printhead 500 axially along imaging drum 300.

As best illustrated in FIG. 2, an annular-shaped axial load magnet 260a is integrally attached to the driven end of threaded shaft 252, and is in a spaced apart relationship with another annular-shaped axial load magnet 260b attached to lathe bed scanning frame 202. Axial load magnets 260a and 260b are preferably made of rare-earth materials such as neodymium-iron-boron. A generally circular-shaped boss 262 part of threaded shaft 252 rests in the hollowed-out portion of annular-shaped axial load magnet 260a, and includes a generally V-shaped surface at the end for receiving a ball bearing 264. A circular-shaped insert 266 is placed in the hollowed-out portion of axial load magnet 260b, and includes an accurate-shaped surface on one end for receiving ball bearing 264, and a flat surface at its other end for receiving an end cap 268 placed over axial load magnet 260b and attached to lathe bed scanning frame 202 for protectively covering axial load magnet 260b and providing an axial stop for lead screw 250. Circular shaped insert 266 is preferably made of material such as Rulon J or Delrin AF, both well known in the art.

Lead screw 250 operates as follows. Linear drive motor 258 is energized and imparts rotation to lead screw 250, as indicated by the arrows, causing lead screw drive nut 254 to move axially along threaded shaft 252. Axial load magnets 260a and 260b are magnetically attracted to each other which prevents axial movement of lead screw 250. Ball bearing 264, however, permits rotation of lead screw 250 while maintaining the positional relationship of annular-shaped axial load magnets 260, i.e., slightly spaced apart, which prevents mechanical friction between them while permitting threaded shaft 252 to rotate.

Figure 4:
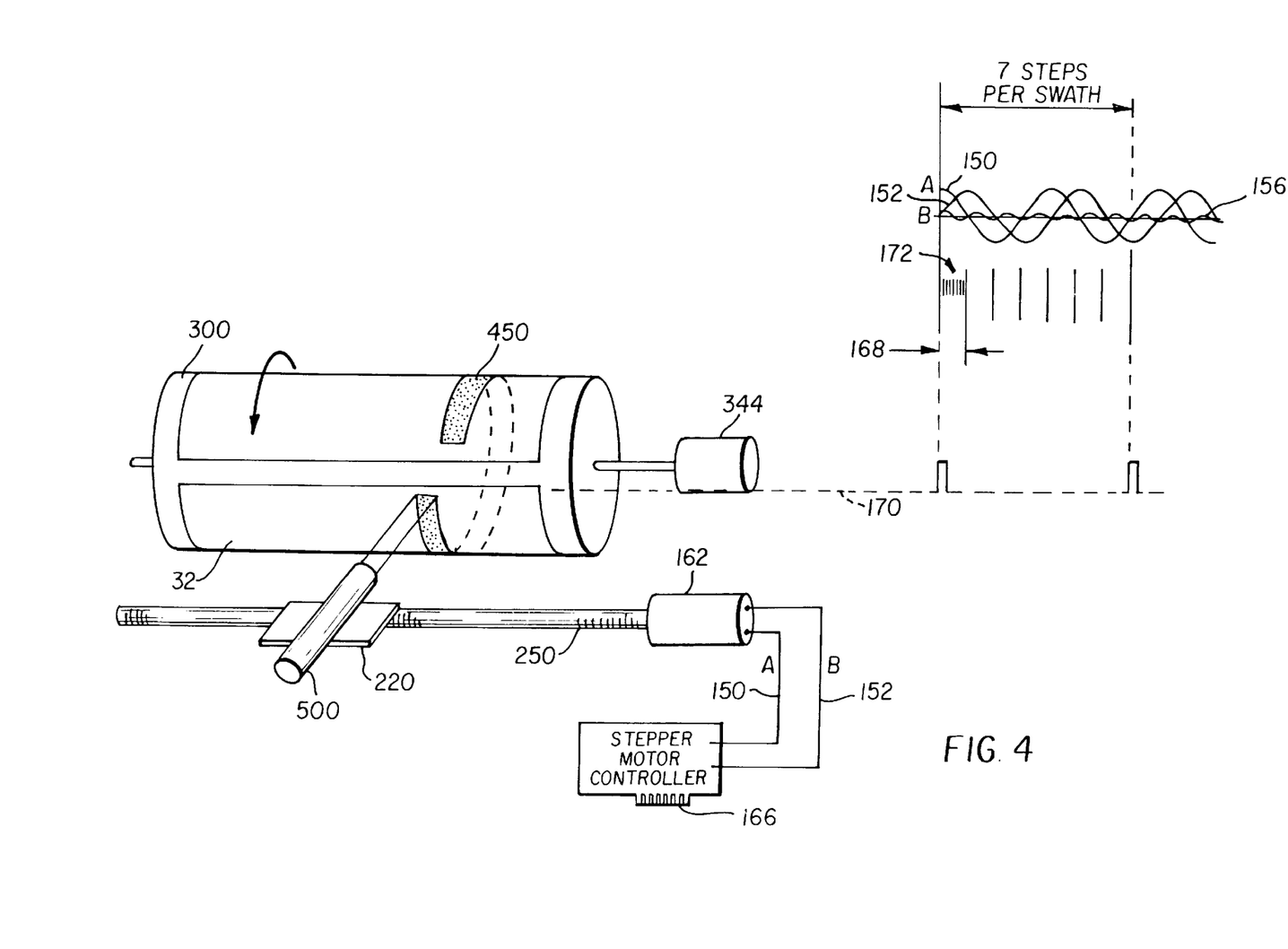
FIG. 4 illustrates, in block diagram form, the timing relationships required to print a single swath of the output image.

Printhead 500 travels in a path along imaging drum 300, while being moved at a speed synchronous with imaging drum 300 rotation and proportional to the width of a writing swath 450 (FIG. 4). The pattern that printhead 500 transfers to a receiver on imaging drum 300, is a helix.

Figures 3A, 3A:
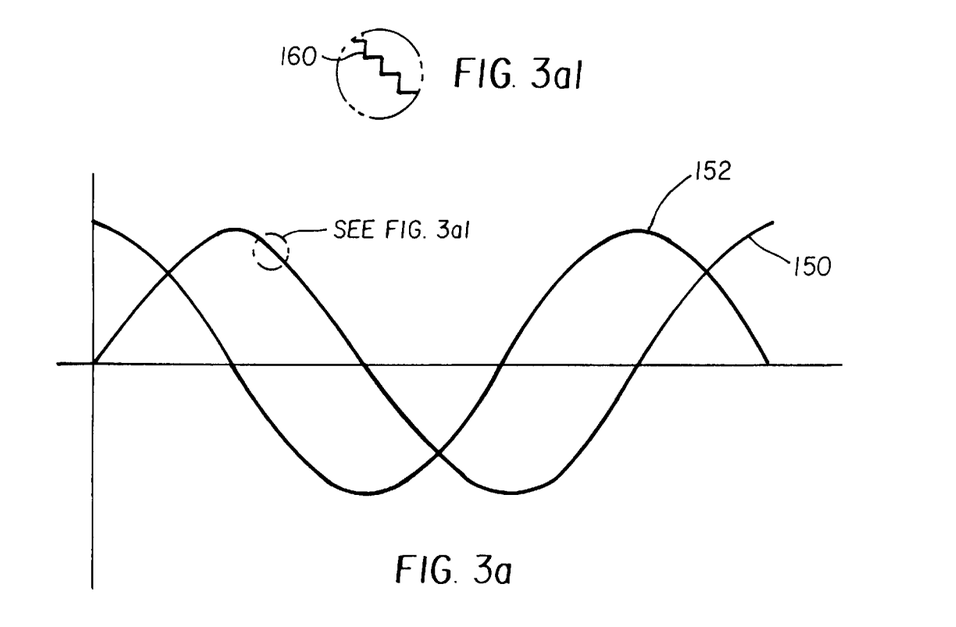
FIGS. 3a to 3f show a series of signal waveforms for microstepping using the techniques of the present invention.

FIG. 3a shows phase-A 150 and phase-B 152 of the microstepping current waveform. Phase-A 150 and phase-B 152 are shifted 90 degrees relative to each other. The microstepping current waveform, although generally sinusoidal, actually comprises a series of discrete steps 160. Using conventional integrated circuit devices such as the IM 2000 Microstepping Controller (as noted above), this waveform can be shaped by means of a look-up table that sets specific values for each discrete microstep.

Figure 3B:
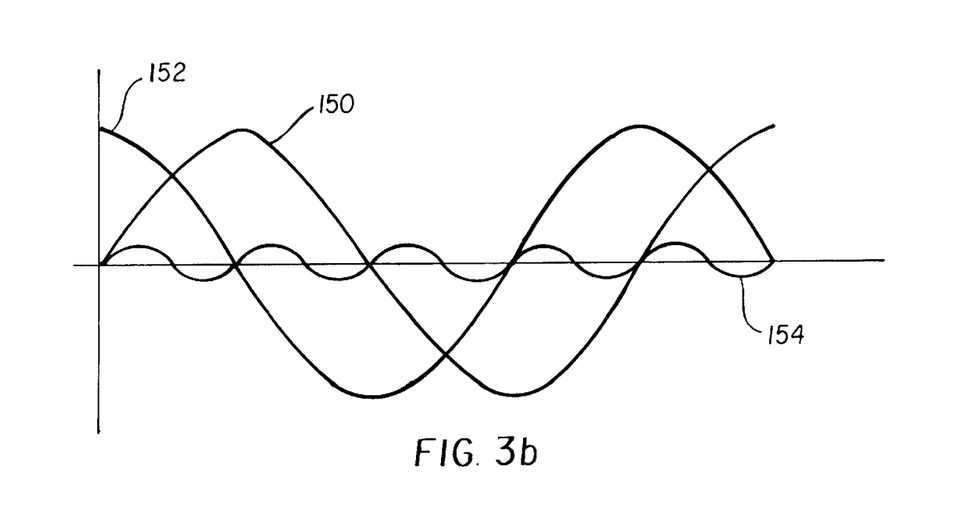

FIG. 3b shows both phases, phase-A 150 and phase-B 152, of the microstepping current waveform with the positional error 154 represented in the same time domain.

Figure 3C:
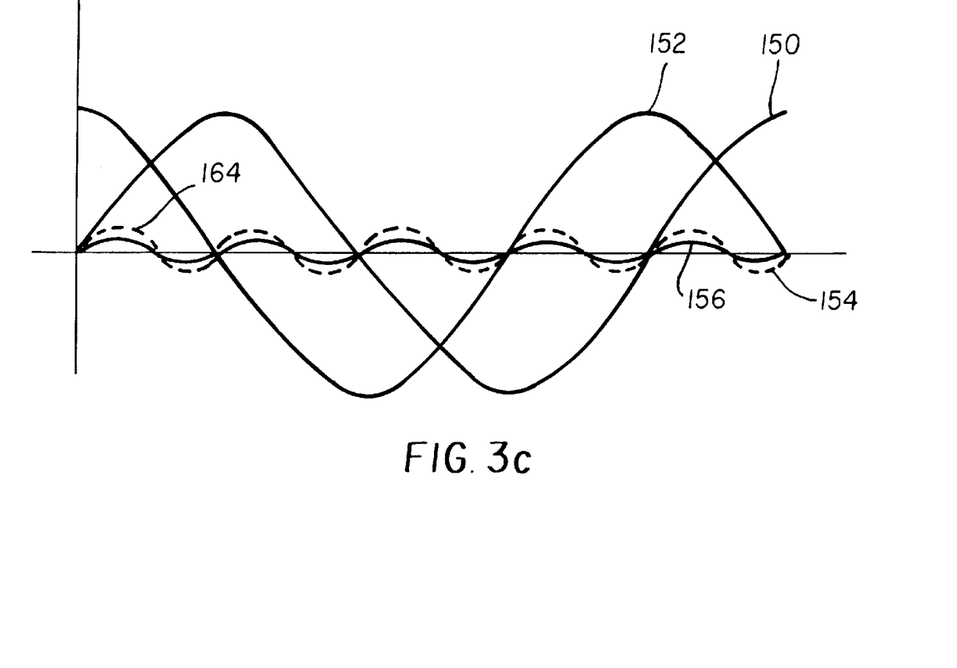
Figure 3D:
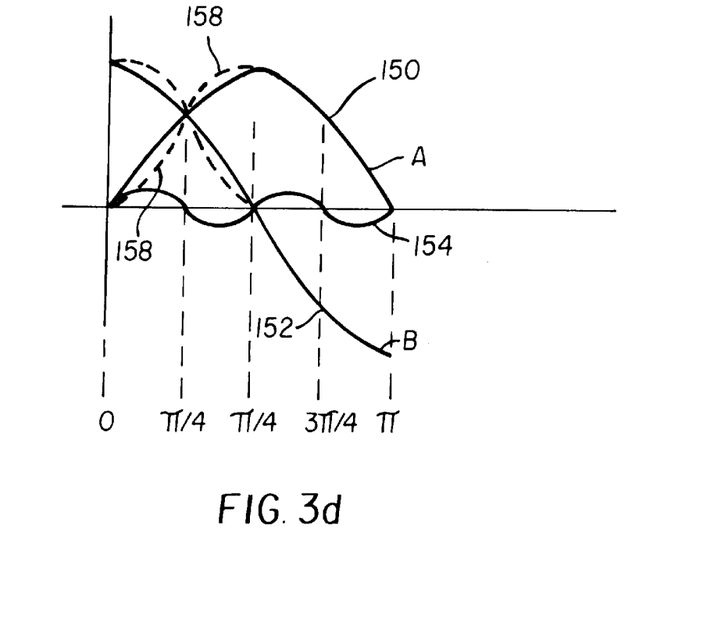
Figure 3E:
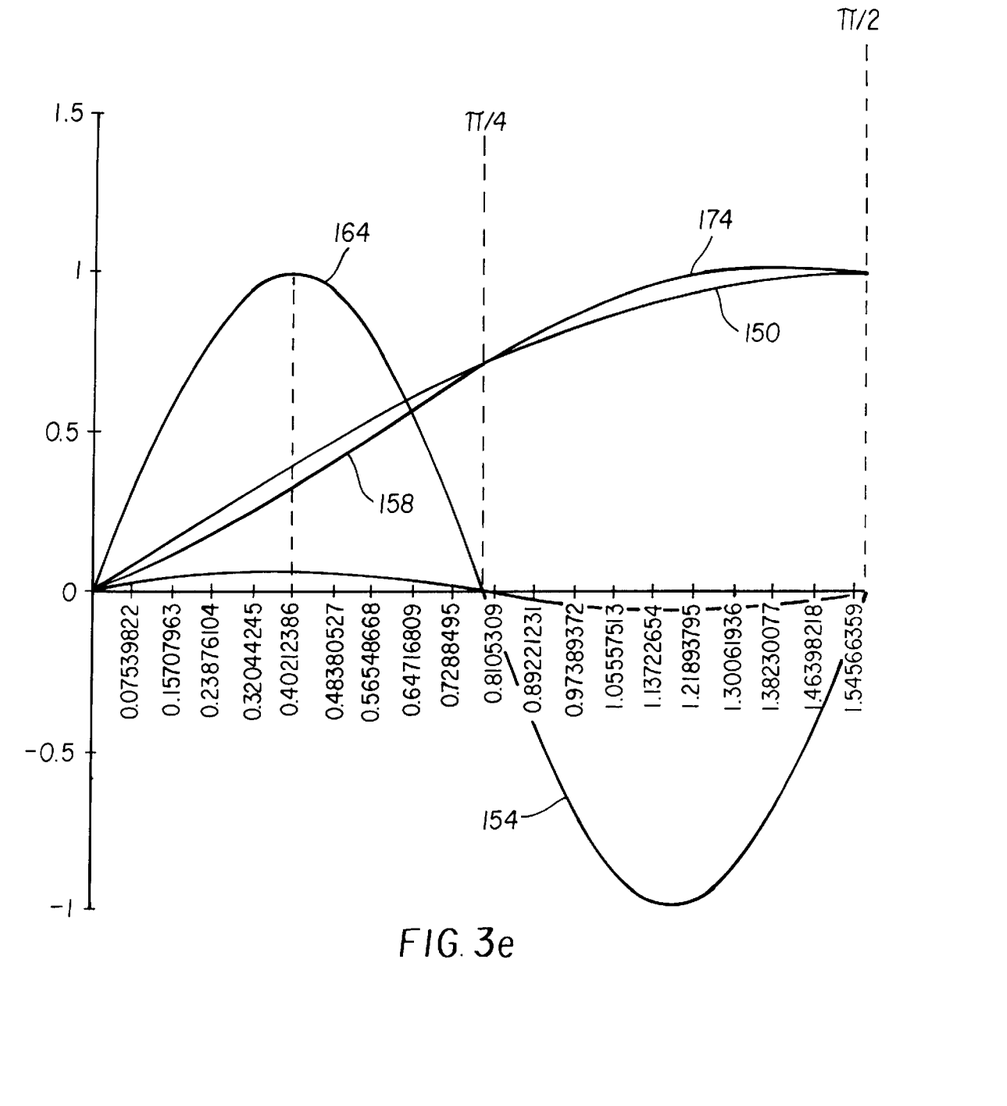
Figure 3F:
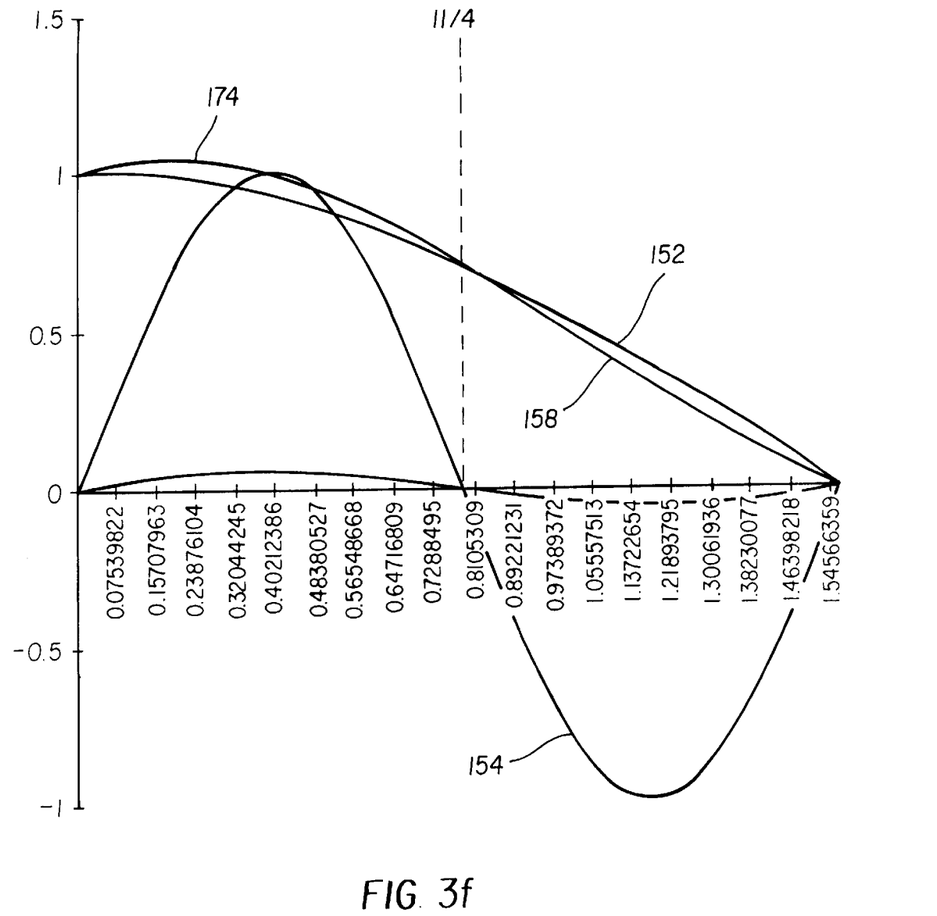

FIG. 3e is a normalized graph illustrating the periodic behavior of windings current for phase-A 150 versus positional error 154. FIG. 3d shows only a quarter-cycle of the phase-A 150 waveform. The same corresponding periodic relationship with the positional error 154 applies for phase-B 152 as is shown in FIG. 3f. Positional error 154, computed from encoder data, is typically expressed in microns. In the illustrative embodiment of the present invention, with a lead screw having an 18 mm pitch, this positional error is approximately 6 microns peak-to-peak, uncorrected. As is shown in FIGS. 3b and 3e, positional error 154 is generally sinusoidal at four times the frequency of the sinusoidal current waveform for either phase-A 150 or phase-B 152. Positional error 154 is at zero eight times during each full cycle of the current waveform, with the timing shown in FIG. 3b.

The phase-A 150 and phase-B 152 currents have a predictable relationship to each other at each "zero-crossing" of positional error 154. Zero positional error 154 occurs when the stepper motor 162 (shown in FIG. 4) is most stable. As FIG. 3b shows, zero-crossing of positional error 154 waveform occurs when both phase-currents, phase-A 150 and phase-B 152, have essentially equal magnitude (with the same or with opposite polarity), and when either phase-current is at zero. Note that these are the stable states of stepper motor 162 when it operates in standard "half-step" mode. Stable states in "full-step" mode occur when either phase current is at zero. This invention uses this timing relationship of positional error 154 to the sinusoidal phase current waveforms that drive the motor. By synchronizing motion when positional error 154 is zero, this invention minimizes the error in the subsystem that positions print head 500.

It should be noted that positional error 154 is measured in linear distance, but is caused by rotational error of stepper motor 162 that drives lead screw 250. The pitch of lead screw 250 determines how much linear positional error 154 results from stepper motor 162 inaccuracy.

A linear positional error 154 of 6 microns peak-to-peak is excessive, considering the need for accuracy swath-to-swath and the additive nature of positional error of print head 500 as it moves from one side of the intermediate on imaging drum 300 to the other. To reduce this print head positional error, this invention applies a waveform-shaping scheme as represented in FIG. 3d. (FIG. 3d shows radians as 0, π/4, π/2, 3π/4, and π for the phase signals, phase-A 150 and phase-B 152, and shows the 4X positional error 154 frequency for reference only.)

As FIG. 3d shows, the phase-B 152 current is slightly increased over the 0 to π/4 portion of the waveform, then decreased over the π/4 to π/2 portion of the waveform. The phase-A 150 current is decreased over the 0 to π/4 portion and increased over the π/4 to π/2 portion.

FIG. 3e shows the effect of this waveform shaping, in finer detail, over the first quarter-cycle of phase-A 150. Note that positional error 154 is normalized as represented in FIG. 3e. The phase-A 150 waveform is slightly attenuated over the 0 to π/4 radians portion. This waveform-shaping then amplifies the phase-A 150 waveform over the π/4 to π/2 portion. This increase may not be desirable. A technique for avoiding this increase in current is described below.

For the preferred embodiment of this invention, the stepper motor controller accepts a 12-bit digital value as input, which gives the stepper motor four thousand ninty six possible values for current over each ¼ cycle. The 12-bit value is stored in memory, in a look-up table. These values are indexed by an 8-bit address, so that there are two hundred fifty six possible 12-bit digital values stored for stepper motor current over each ¼ cycle. Since the preferred embodiment uses sixty four microsteps per step, every fourth microstep index value is used.

The computation for each microstep in an uncorrected composite sine wave is as follows:

$$\text{uncorrected value} = \sin\left(\frac{\pi}{2} \cdot \frac{\text{\# step}}{64}\right) \cdot 4095$$

Note that there are sixty four microsteps to the full step, which is $\pi/2$ radians. For example, the uncorrected value for the first microstep is 100.

$$\sin\left(\frac{\pi}{2} \cdot \frac{1}{64}\right) \cdot 4095 = 100$$

The method for computing waveform-shaping proceeds as follows. Find the error at worst-case position 164. Worst-case position 164 occurs where positional error 154 peaks. At this point, determine the difference between actual position and intended position, in microsteps (for example, six microsteps error). This difference value can be positive or negative. Next, compute the ratio of this error, in microsteps, to the number of microsteps counted from the last zero-error position. For example, where the peak error is at 60 microsteps, with three microsteps error as above, the ratio is 3/60, or 0.05. Finally, for each discrete microstep in the interval of interest, compute a corrected value. This corrected value is computed by subtracting, from the uncorrected value computed as noted above, a correction factor that uses the ratio computed in step two and the sine of the characteristic periodic positional error, as given by:

$$\text{corrected value} = \left[\sin\left(\frac{\pi}{2} \cdot \frac{\text{\# step}}{64}\right) - (.05)\left(\sin\left(4\left(\frac{\pi}{2}\right) \cdot \frac{\text{\# step}}{64}\right)\right)\right] \cdot 4095$$

For example, with the error ratio given above, the corrected value for the first microstep is computed as follows:

$$\left[\sin\left(\frac{\pi}{2} \cdot \frac{1}{64}\right) - (.05)\left(\sin\left(4\left(\frac{\pi}{2}\right) \cdot \frac{1}{64}\right)\right)\right] \cdot 4095 = 80$$

Using the above equations, the corrected values can be computed over any segment of the composite current waveform. The following table is a list of current values for each of the 32 microsteps in the 0 to $\pi/4$ segment of the composite current waveform using the computation of the the present invention, when the number of U-steps per step is 64, the total resolution is 4096, and the correction ratio is 0.05:

Table showing uncorrected (U) and corrected (C) values

| # step # | 8-bit index | 12-bit U-value | 12-bit C-value |
|---|---|---|---|
| 0 | 0 | 0 | 0 |
| 1 | 4 | 100 | 80 |
| 2 | 8 | 201 | 160 |
| 3 | 12 | 301 | 241 |
| 4 | 16 | 401 | 323 |
| 5 | 20 | 501 | 404 |
| 6 | 24 | 601 | 487 |

-continued

Table showing uncorrected (U) and corrected (C) values

| # step # | 8-bit index | 12-bit U-value | 12-bit C-value |
|---|---|---|---|
| 7 | 28 | 700 | 570 |
| 8 | 32 | 799 | 654 |
| 9 | 36 | 897 | 738 |
| 10 | 40 | 995 | 824 |
| 11 | 44 | 1092 | 911 |
| 12 | 48 | 1189 | 999 |
| 13 | 52 | 1285 | 1088 |
| 14 | 56 | 1380 | 1178 |
| 15 | 60 | 1474 | 1270 |
| 16 | 64 | 1567 | 1362 |
| 17 | 68 | 1659 | 1455 |
| 18 | 72 | 1751 | 1550 |
| 19 | 76 | 1841 | 1645 |
| 20 | 80 | 1930 | 1741 |
| 21 | 84 | 2018 | 1837 |
| 22 | 88 | 2105 | 1935 |
| 23 | 92 | 2191 | 2032 |
| 24 | 96 | 2275 | 2130 |
| 25 | 100 | 2358 | 2228 |
| 26 | 104 | 2439 | 2325 |
| 27 | 108 | 2519 | 2422 |
| 28 | 112 | 2598 | 2519 |
| 29 | 116 | 2675 | 2615 |
| 30 | 120 | 2750 | 2710 |
| 31 | 124 | 2824 | 2803 |
| 32 | 128 | 2896 | 2895 |

Figure 5:
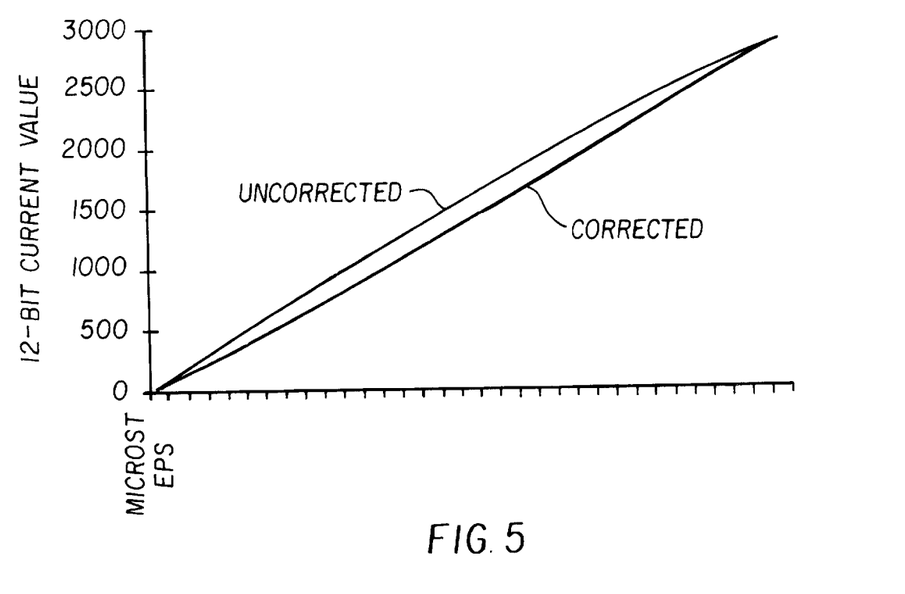
FIG. 5 shows the correction that the present invention provides for a 0 to $\pi/4$ segment of the composite sine wave.

FIG. 5 shows the slight correction that this method provides for this 0 to $\pi/4$ segment of the composite sine wave.

Using this method, a 12-bit value is computed to correct the composite current waveform at each discrete microstep.

It is important to note that the 4X positional error 154 waveform crosses zero at each integral multiple of $\pi/4$ radians of the composite current waveform. At these points, the sine is zero, which means that there is no correction to the current waveform at these points. This method thus preserves the composite value where error is zero and provides correction that changes, depending on the relative amount of positional error at each point.

This sequence of operations can be applied over any $\pi/4$ segment of the phase-A 150 or phase-B 152 waveform, as is shown for the phase-A 150 waveform in FIG. 3e. FIG. 3e shows example curves where the error ratio (computed using Step 2 in the above procedure) equals 0.06.

As FIG. 3e indicates, the corrected current waveform 158 that is calculated using the above procedure may include values slightly increased or slightly decreased from the uncorrected sinusoidal phase-A 150 waveform. FIG. 3f shows this same effect for the phase-B 152 waveform. The positive or negative polarity of the positional error (from step 1 above) can result in an increase to the current waveform beyond 100% over an interval of $\pi/4$ radians. Empirical testing shows that accurate, repeatable results are achieved by compensating for only one phase waveform at a time. This technique avoids introducing possible anomalies that could be caused over the interval of increased current 174.

By using this procedure, the positional error for the implementation detailed in this invention can be reduced to approximately 2 microns peak-to-peak, as is indicated by the reduced positional error 156 represented in FIG. 3c. In the image processing apparatus described here, the uncorrected error was calculated in a range of 0.03%. Using the method disclosed in this invention, the error was reduced to approximately 0.01%.

By characterizing positional error 154 and compensating for this error by shaping the current waveforms, this method allows the subsystem that drives print head 500 to use a coarser screw pitch than with previous.

The method of waveform shaping of the present invention differs significantly from methods that attenuate (or amplify) the waveform using only the harmonic content of the composite current waveform. A typical method is to attenuate the third harmonic and effectively "smooth" the overall shape of the waveform, since the third and other odd harmonics have the effect of "squaring" a sinusoidal waveform. By using the periodic positional error characteristic, the method of this invention avoids the problem of overcorrection, since the positional error is zero at known positions of the microstepping current waveform. Moreover, instead of shifting the positional error characteristic (that is, shifting the "zero-crossing" points), this method identifies and preserves precisely those points where the positional error is inherently zero. In doing so, this method allows regular synchronization of motor position with current waveform timing. This method also allows rapid switching between microstepping mode and simple stepping mode using full steps. Stepper motor 162 can be run in microstepping mode during imaging of writing swath 450 and can then be switched to full-step mode in between writing swaths 450.

FIG. 4 shows, in simplified block diagram form, the timing relationships and typical values for the implementation described here. The figure shows the mechanical components whose interrelated operation writes a series of writing swaths 450 from print head 500 to a sheet of print media 32 that is wrapped around imaging drum 300 (a single writing swath 450 is represented in FIG. 4, not to scale). As the drum rotates, lead screw 250, driven by stepper motor 162, rotates to move print head 500, mounted on translation stage member 220. Stepper motor 162 has four hundred full steps 168 per revolution, in this embodiment. A stepper motor controller 166 drives the stepper motor in microstepping mode, with the timing relationships shown in FIG. 4.

An index pulse 170 from a drum encoder 344 for imaging drum 300 serves to synchronize the timing of the stepper motor 162. Stepper motor controller 166 drives the stepper motor in microstepping mode, with the timing relationships shown in FIG. 4. In the illustrative embodiment, stepper motor 162 requires seven full steps 168 per writing swath 450. Microstepping allows sixty four microsteps 172 per step, so that the full writing swath 450 requires four hundred forty eight microsteps 172.

Print head 500 movement stops momentarily over a "dead band" at leading and trailing edges of print media 32 that is mounted on vacuum imaging drum 300.

An index pulse 170 from drum encoder 344 for imaging drum 300 serves to synchronize the timing of stepper motor 162. As FIG. 4 shows, this synchronization is performed when the reduced positional error 156 of stepper motor 162 is at zero.

This embodiment allows stepper motor 162 to operate in both full-step mode and in microstepping mode. While writing the writing swath 450, as described above, stepper motor 162 operates in microstepping mode. Then, when necessary to move accurately to a different position, stepper motor 162 can be run in full-step mode. Recall that the positional accuracy in full-step mode is inherently better than the accuracy of the same motor when in microstepping mode.

The invention has been described with reference to the preferred embodiment thereof. However, it will be appreciated and understood that variations and modifications can be effected within the spirit and scope of the invention as described herein above and as defined in the appended claims. by a person of ordinary skill in the art without departing from the scope of the invention. For example, the invention is applicable to any application where a stepper motor is used in microstepping mode. This includes imaging and other applications. Waveform shaping, using the method described in this invention that uses the periodic error characteristic at 4 times the sinusoidal frequency of the phase windings current, can be applied over the full phase waveform, or can be applied to discrete portions of the waveform for one or both motor phase windings.

What is claimed is:

1. A method for shaping a composite windings drive current waveform of a stepping motor running in microstepping mode so as to minimize positioning error of the stepping motor; said method comprising the steps of:

determining a characteristic positional error that is periodic at four times the sinusoidal frequency of the composite windings drive current waveform; and variably adjusting the windings drive current waveform at each microstep based on the characteristic positioning error.

2. A method for shaping a composite windings drive current waveform as set forth in claim 1 wherein the windings drive current waveform adjusting step includes attenuating the windings drive current waveform.

3. A method for shaping a composite windings drive current waveform as set forth in claim 1 wherein the windings drive current waveform adjusting step includes increasing the windings drive current waveform.

4. A method for shaping a composite windings drive current waveform as set forth in claim 1 wherein:

the composite windings drive current waveform is sinusoidal and is made up of a plurality of portions; and at least one, but not all, of the portions of the sinusoidal drive current waveform is adjusted in the variably adjusting step, leaving other portions of the drive current waveform unaffected by the variably adjusting step.

5. A method for shaping a composite windings drive current waveform as set forth in claim 1 wherein the variably adjusting step effects a changing magnitude of adjustment based on the amount of positional error such that there is zero adjustment when there is zero positional error.

6. A method for shaping a composite windings drive current waveform as set forth in claim 1 wherein:

the drive current waveform comprises a plurality of portions for each of a plurality of phase windings of the stepping motor to form a sinusoidal composite phase drive current waveform with a plurality of phase currents;

alternate portions of the drive current waveform for each phase winding are modified; and only one of the phase currents is modified at any one time, alternating over each $\pi/4$ segment of the sinusoidal composite phase drive current waveform.

* * * * *